US010636273B2

(12) United States Patent
Tamura et al.

(10) Patent No.: US 10,636,273 B2
(45) Date of Patent: Apr. 28, 2020

(54) COORDINATE MEASURING DEVICE

(71) Applicant: MITUTOYO CORPORATION, Kanagawa (JP)

(72) Inventors: Kentaro Tamura, Tokyo (JP); Hideaki Fujihara, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/181,658

(22) Filed: Nov. 6, 2018

(65) Prior Publication Data

US 2019/0147728 A1 May 16, 2019

(30) Foreign Application Priority Data

Nov. 16, 2017 (JP) .................. 2017-221033

(51) Int. Cl.
| | | |
|---|---|---|
| G01B 21/02 | (2006.01) | |
| G01B 21/16 | (2006.01) | |
| G08B 21/18 | (2006.01) | |
| G01B 5/008 | (2006.01) | |
| G01B 11/00 | (2006.01) | |
| G06T 7/521 | (2017.01) | |
| G01B 21/04 | (2006.01) | |

(Continued)

(52) U.S. Cl.
CPC ........... *G08B 21/182* (2013.01); *G01B 5/008* (2013.01); *G01B 11/005* (2013.01); *G01B 11/026* (2013.01); *G01B 21/047* (2013.01); *G06T 7/521* (2017.01); *G06T 7/70* (2017.01); *G06T 2207/10028* (2013.01); *G06T 2207/30164* (2013.01); *G06T 2207/30244* (2013.01)

(58) Field of Classification Search
CPC .. G08B 21/182; G01B 11/026; G01B 21/047; G01B 11/005; G01B 5/008; G06T 7/521; G06T 7/70; G06T 2207/30164; G06T 2207/10028; G06T 2207/30244
See application file for complete search history.

(56) References Cited

U.S. PATENT DOCUMENTS 5,410,410 A * 4/1995 Yamazaki ............. G01B 11/26
                                                356/601
5,793,492 A * 8/1998 Vanaki ................ G01B 11/245
                                                356/608

(Continued)

FOREIGN PATENT DOCUMENTS

DE    102008022372 A1 * 11/2009 ............. G01N 21/49
JP    2012-127805 A       7/2012

*Primary Examiner* — Philip P. Dang

(74) *Attorney, Agent, or Firm* — Greenblum & Bernstein, P.L.C.

(57) ABSTRACT

A coordinate measuring device includes a non-contact-type measurement probe having a light emitter that emits light at a work piece along a plane, and an image capturer that captures an image of the emitted light produced by a surface of the work piece; a determiner that determines whether a distance from the measurement probe to the work piece is in an imageable range where the image of the emitted light can be captured, in a far range that is more distant than the imageable range, or in a proximal range that is closer than the imageable range; a notification device issuing a notification of results of a determination made by the determiner; and a memory storing the determination results.

5 Claims, 9 Drawing Sheets

(51) Int. Cl.
  *G01B 11/02*   (2006.01)
  *G06T 7/70*    (2017.01)

(56) References Cited

U.S. PATENT DOCUMENTS

| | | | | |
|---|---|---|---|---|
| 6,163,628 | A * | 12/2000 | Ibenthal | G06T 9/001 |
| | | | | 375/E7.204 |
| 6,205,243 | B1 * | 3/2001 | Migdal | G01B 11/2518 |
| | | | | 382/154 |
| 7,158,915 | B2 | 1/2007 | Wargon | A22C 17/0013 |
| | | | | 702/156 |
| 7,582,874 | B2 * | 9/2009 | Reminiac | G01N 15/0227 |
| | | | | 250/341.2 |
| 7,995,216 | B2 * | 8/2011 | Van Berkel | H01J 49/0459 |
| | | | | 250/306 |
| 8,319,976 | B2 * | 11/2012 | Kawai | G01B 11/24 |
| | | | | 356/601 |
| 8,537,182 | B2 * | 9/2013 | Hasegawa | G09G 3/2018 |
| | | | | 345/691 |
| 8,666,696 | B2 * | 3/2014 | Hanai | G01N 3/20 |
| | | | | 702/150 |
| 9,277,860 | B2 * | 3/2016 | Komine | G01B 9/02064 |
| 9,354,041 | B2 * | 5/2016 | Yamagata | G01B 11/005 |
| 9,354,042 | B2 * | 5/2016 | Tsujii | G01B 11/002 |
| 9,395,178 | B2 * | 7/2016 | Takai | G01S 17/48 |
| 9,696,897 | B2 * | 7/2017 | Garcia | G01B 11/02 |
| 9,746,308 | B2 * | 8/2017 | Gong | G01B 7/012 |
| 9,795,015 | B2 * | 10/2017 | Di Censo | H05B 37/0227 |
| 9,835,726 | B2 * | 12/2017 | Ossig | G01S 17/42 |
| 9,864,062 | B2 * | 1/2018 | Bockem | G01S 17/66 |
| 9,897,442 | B2 * | 2/2018 | Pettersson | G01B 5/008 |
| 9,970,907 | B2 * | 5/2018 | Ten Grotenhuis | G01N 29/225 |
| 10,027,884 | B2 * | 7/2018 | Kalama | H04N 5/23293 |
| 10,254,404 | B2 * | 4/2019 | Demirel | G01B 11/00 |
| 10,313,599 | B2 * | 6/2019 | Fuchikami | G01C 3/06 |
| 10,415,950 | B2 * | 9/2019 | Gong | G01B 7/012 |
| 10,469,777 | B2 * | 11/2019 | Pawlowicz | H04N 5/357 |
| 2014/0037135 | A1 * | 2/2014 | Kutliroff | G06F 3/017 |
| | | | | 382/103 |
| 2015/0268043 | A1 * | 9/2015 | McFadden | G01C 11/04 |
| | | | | 702/159 |
| 2017/0143442 | A1 * | 5/2017 | Tesar | A61B 90/37 |
| 2017/0176181 | A1 * | 6/2017 | Machii | G01B 15/04 |
| 2017/0241919 | A1 * | 8/2017 | Machii | G01N 23/04 |
| 2018/0023947 | A1 * | 1/2018 | Meng | G01B 11/25 |
| | | | | 348/46 |
| 2018/0071987 | A1 * | 3/2018 | Tsumuraya | B29C 64/393 |
| 2019/0184568 | A1 * | 6/2019 | Karlsson | G01S 13/10 |

\* cited by examiner

COORDINATE MEASURING DEVICE

CROSS-REFERENCE TO RELATED APPLICATIONS

The present application claims priority under 35 U.S.C. § 119 of Japanese Application No. 2017-221033, filed on Nov. 16, 2017, the disclosure of which is expressly incorporated by reference herein in its entirety.

BACKGROUND OF THE INVENTION

1. Field of the Invention

The present invention relates to a coordinate measuring device that measures a three-dimensional shape of a work piece by emitting light at the work piece and capturing an image of the emitted light produced by a surface of the work piece.

2. Description of Related Art

A coordinate measuring device having a non-contact-type measurement probe is known. Such a non-contact-type measurement probe includes, for example, an illumination apparatus that emits light at a work piece along a plane, and an image capture apparatus that captures, from a position other than the above-noted plane, an image of the emitted light produced by a surface of the work piece.

In such a non-contact-type measurement probe, the direction in which the light is emitted and the direction of image capture by the image capture apparatus intersect. Therefore, in order to capture an image of the emitted light, the distance from the measurement probe to the work piece must be set within an imageable range. Whether the distance from the measurement probe to the work piece is within the imageable range can be verified on a display screen of a PC connected to the coordinate measuring device, for example. However, in such a case, a measurement operator must watch both the display screen and the work piece, which may lead to decreased operability.

In order to resolve this issue, Japanese Patent Laid-open Publication No. 2012-127805, for example, describes providing a non-contact-type measurement probe with an indicator light emitter that emits an indicator light having a wavelength different from that of the light used for measurement and, by both emitting the indicator light from the indicator light emitter at a surface of a work piece and changing the color of the indicator light in accordance with the distance between the work piece and the measurement probe, verifying whether the distance between the work piece and the measurement probe is within an imageable range.

When the non-contact-type measurement probe touches the work piece, it may damage the measurement probe and lead to reduced measurement accuracy accompanying such damage. Accordingly, when the measurement probe approaches the work piece more closely than a set amount, preferably this is discerned and a warning or the like is issued. However, in a case where the distance from the measurement probe to the work piece drifts out of the imageable range, determining whether the distance is more distant than the imageable range or closer than the imageable range is not possible in the technology described above in Japanese Patent Laid-open Publication No. 2012-127805, for example.

SUMMARY OF THE INVENTION

In view of the above, the present invention provides a coordinate measuring device that is capable of inhibiting contact between a work piece and a measurement probe.

In order to resolve such issues, a coordinate measuring device according to an embodiment of the present invention includes a non-contact-type measurement probe having an illumination apparatus that emits light at a work piece along a plane, and an image capture apparatus that captures, from a position other than the above-noted plane, an image of the emitted light produced by a surface of the work piece; a determination device determining whether a distance from the measurement probe to the work piece is in an imageable range where the image capture apparatus can capture the image of the emitted light, in a far range that is more distant than the imageable range, or in a proximal range that is closer than the imageable range; a notification device issuing a notification of results of a determination made by the determination device; and a memory device storing the determination results. Furthermore, at the point where light begins to be emitted, the determination device stores in the memory device, as the determination results, information indicating that the distance to the work piece is within the far range. Also, the determination device references results of image capture by the image capture apparatus and the determination results stored in the memory device and determines the range of the distance to the work piece, and updates the determination results stored in the memory device.

Also, when determining the range of the distance from the measurement probe to the work piece, the determination device determines whether the image of the emitted light has been captured by the image capture apparatus, and when the determination device determines that the image has been captured, the determination device can determine that the distance to the work piece is within the imageable range. Also, when the determination device does not determine that the image of the emitted light has been captured by the image capture apparatus, the determination device can reference the determination results stored in the memory device, and when information indicating that the distance to the work piece is within the far range is stored as the determination results, the determination device can determine that the distance to the work piece is within the far range, and when information indicating that the distance to the work piece is within the proximal range is stored as the determination results, the determination device can determine that the distance to the work piece is within the proximal range.

In addition, when determining the range of the distance from the measurement probe to the work piece, in a case where the determination device determines that the image of the emitted light has been captured, the determination device can calculate and store in the memory device the distance to the work piece based on the image of the emitted light. Also, when the determination device does not determine that the image of the emitted light has been captured, and information indicating that the distance to the work piece is within the imageable range is stored in the memory device as the determination results, based on the information indicating the distance to the work piece that is stored in the memory device, the determination device can determine that the distance to the work piece is within the far range or within the proximal range.

Also, a housing that accommodates the illumination apparatus and the image capture apparatus can be provided to the measurement probe, and a light emitting device provided to a surface of the housing can be provided as the notification device.

In addition, a sound generating device producing a sound that provides notification of the determination results can be provided as the notification device.

Moreover, a grip that is gripped by a measurement operator during measurement can be provided to the measurement probe, and a vibration generating device that provides notification of the determination results by vibrating the grip can be provided as the notification device.

In addition, a contact-type measurement probe can be mounted to the non-contact-type measurement probe. Also, during measurement using the contact-type measurement probe, the determination device can determine the range of the distance from the non-contact-type measurement probe to the work piece.

According to the present invention, a coordinate measuring device that is capable of inhibiting contact between a work piece and a measurement probe can be provided.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Coordinate Measuring Device

Figure 1:
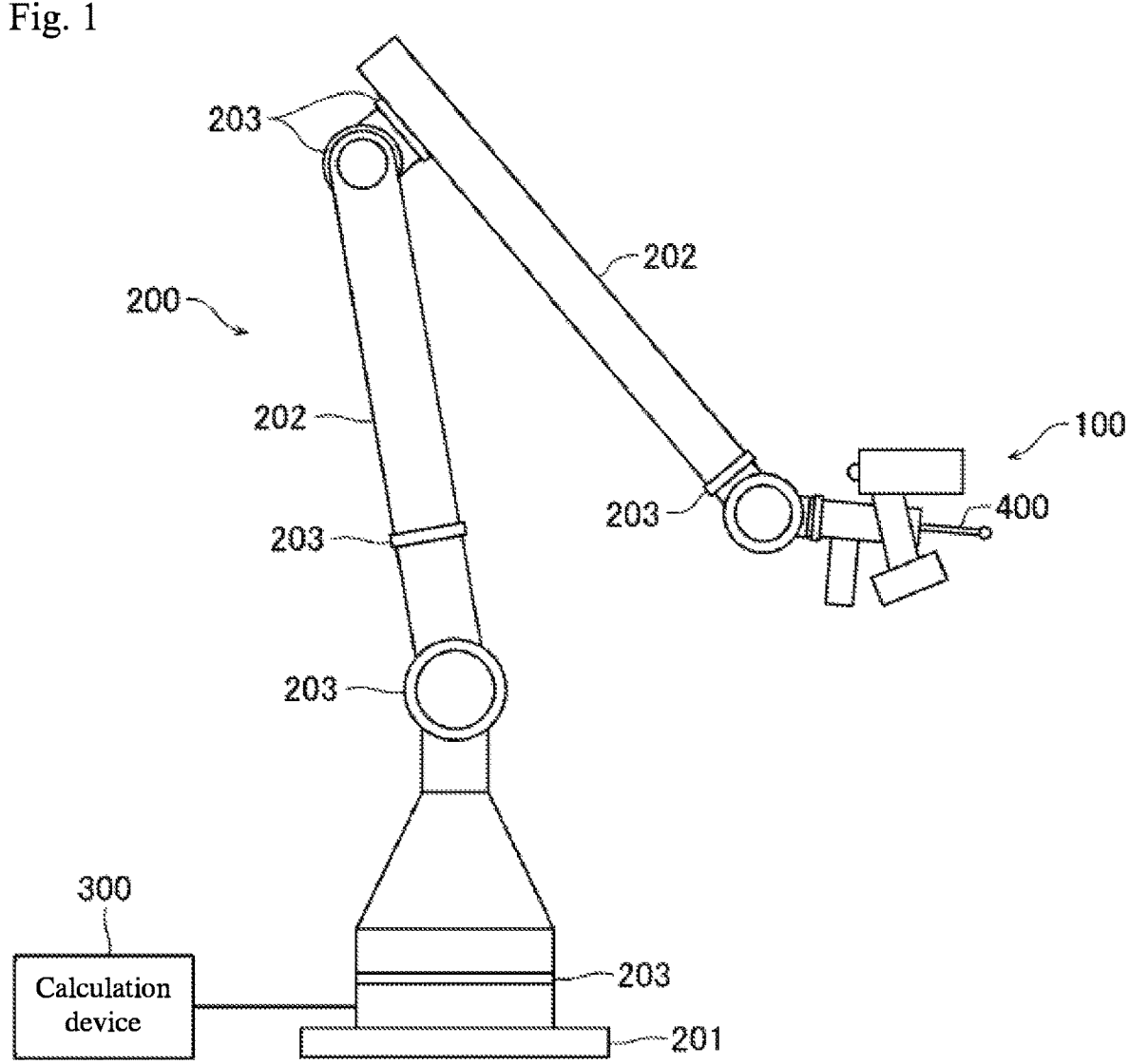
FIG. 1 illustrates a configuration of a coordinate measuring device according to an embodiment of the present invention.

As illustrated in FIG. 1, a coordinate measuring device according to an embodiment of the present invention includes a non-contact-type measurement probe 100; a multijoint arm 200 that movably supports the measurement probe 100 and also measures the position and angle of the measurement probe 100; and a calculation device 300 that performs computation on output values from the measurement probe 100 and the multijoint arm 200 and calculates a measured value. In addition, a contact-type measurement probe 400 is mounted to the measurement probe 100.

Figure 2A:
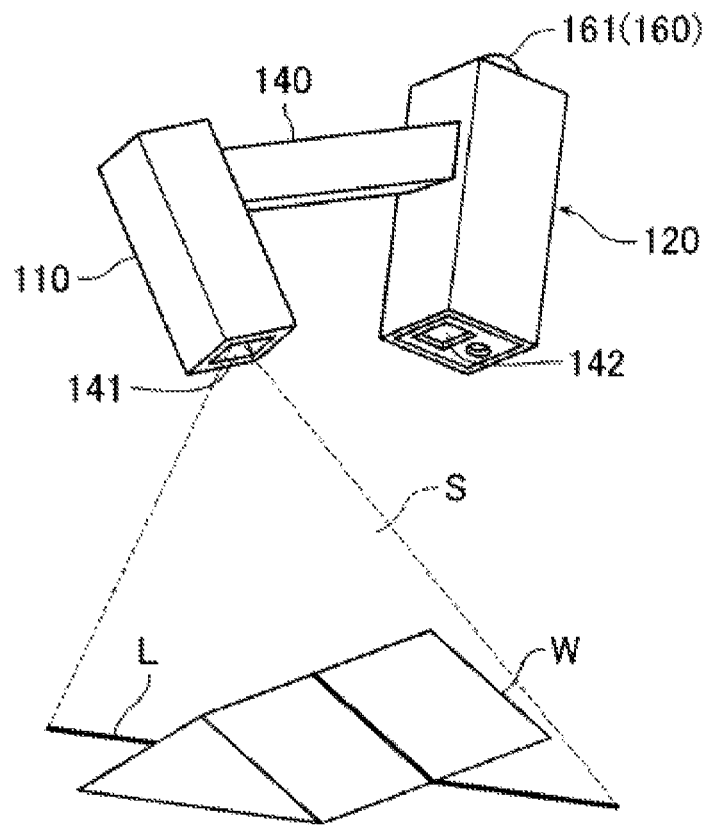
FIGS. 2A and 2B are explanatory diagrams of a measurement probe 100.
Figure 2B:
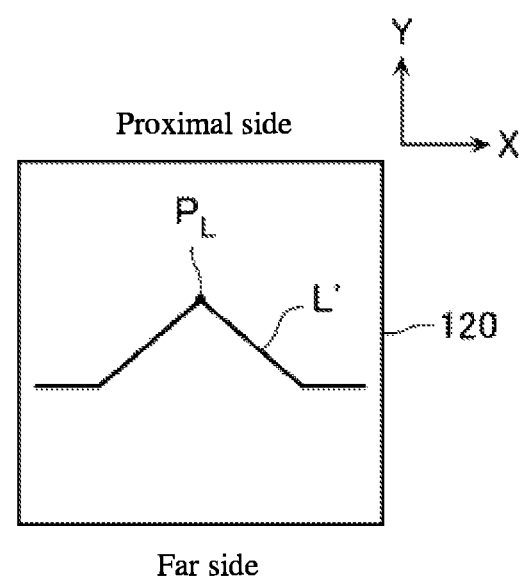

As illustrated in FIG. 2A, the measurement probe 100 includes an illumination apparatus (light emitter) 110 that emits light at a work piece W along a plane S, and an image capture apparatus (image capturer) 120 that captures, from a position other than the plane S, an image L of the emitted light produced by a surface of the work piece W. The plane S passes through a emitting plane of the illumination apparatus 110 and is substantially perpendicular to the emitting plane. Since the emitted light is emitted along the plane S, an image L of the emitted light is produced by the surface of the work piece W where the emitted light is in a straight line or curved line reflecting unevenness of the surface of the work piece W. When the image L of the emitted light is captured from a position other than the plane S, as illustrated in FIG. 2B, an image L' is formed on a light-receiving surface of the image capture apparatus 120, the image L' extending in an X direction and featuring unevenness in a Y direction. The X direction position of each point configuring the image L' corresponds to the position of each point configuring the image L produced by the surface of the work piece W. In addition, the Y direction position of the points corresponds to the distance from each point configuring the image L to the illumination apparatus 110, i.e., the distance to the measurement probe 100. Of the points configuring the image L', the point closest to a proximal side of the light-receiving surface is called a "proximal point $P_L$." The proximal point $P_L$ is information indicating the distance from the measurement probe 100 to the work piece W.

As illustrated in FIG. 1, the multijoint arm 200 includes a base 201, and a plurality of arm portions 202 and joint portions 203 that are alternatingly connected between the base 201 and the measurement probe 100. The arm portions 202 are formed in substantially a cylindrical shape, for example. The joint portions 203 are provided at connector portions of two arm portions 202, and include an angle measurement device such as a rotary encoder that measures a relative angle between the two arm portions 202. The coordinate measuring device according to the present embodiment includes the multijoint arm 200, but in place of the multijoint arm 200, it may instead use a configuration that includes a sample stage on which the work piece W is installed; X, Y, and Z axes that drive the measurement probe 100 in three dimensions; and a distance measurement device such as a linear encoder that is coupled to the X, Y, and Z axes and measures, for example, the position of the measurement probe 100. Moreover, a configuration may also be used in which the position and angle of the measurement probe 100 is calculated by an image capturer or the like.

The calculation device 300 is, for example, a calculation device such as a PC. Using the output values of the angle measurement device inside the multijoint arm 200, the calculation device 300 calculates position data that indicates the relative position and relative angle of the measurement probe 100 relative to the base 201, and calculates the shape of the work piece W using this position data and the output values of the measurement probe 100.

Measurement Probe 100

Figure 3:
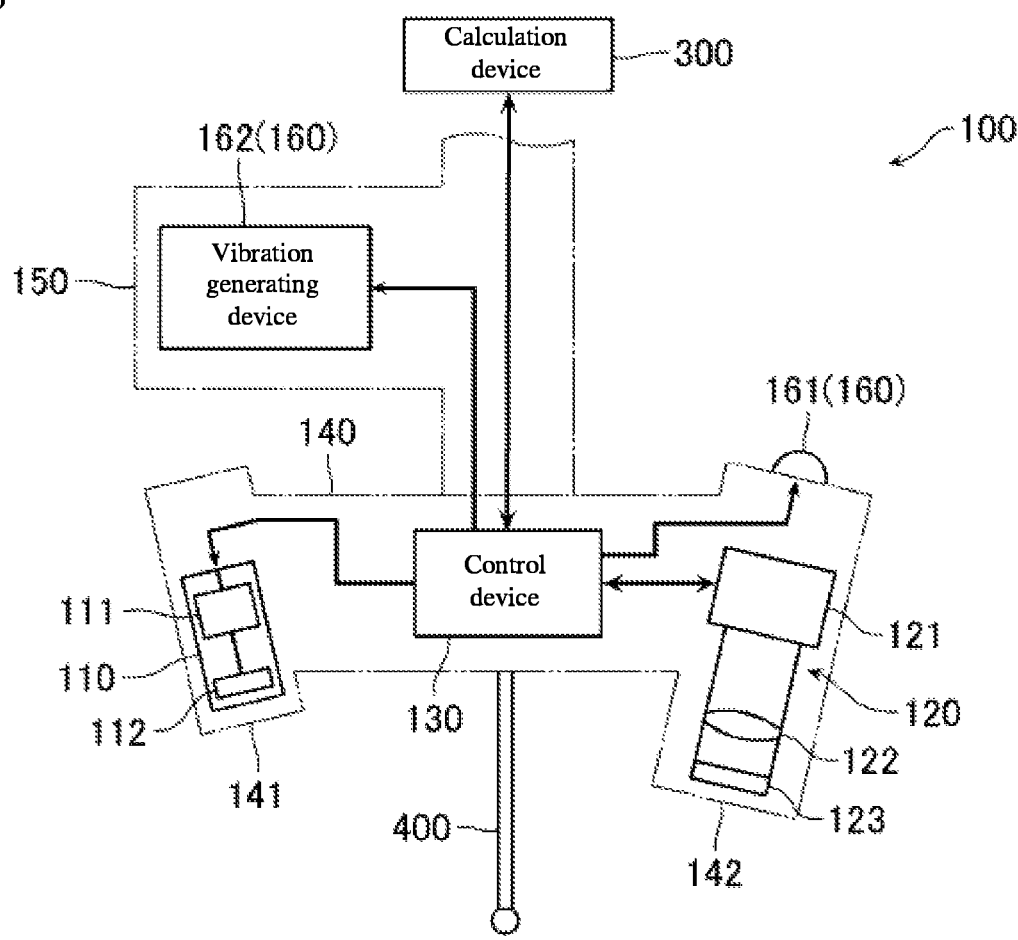
FIG. 3 is a block diagram illustrating a configuration of the measurement probe 100.

As illustrated in FIG. 3, the measurement probe 100 includes the illumination apparatus 110; the image capture apparatus 120; a control device 130 controlling the illumination apparatus 110 and image capture apparatus 120; a housing 140 accommodating the illumination apparatus 110, the image capture apparatus 120, and the control device 130; a grip 150 that is gripped by a measurement operator during measurement; and a notification device (notifier or indicator) 160 that performs a notification process of notifying the measurement operator in accordance with a command from the control device 130.

The illumination apparatus 110 includes a light source 111 that generates light; and a beam expander 112 that broadens the light in a direction orthogonal to the plane of the drawing sheet to serve as the emitted light that follows the plane S (FIG. 2A). The light source 111 is, for example, a laser light source, an LED, or some other light source. The beam expander 112 is, for example, a rod lens, a cylindrical lens, or some other lens, or is a galvano-mirror, a polygon mirror, or some other scanning mirror. A plurality of light sources arrayed in a straight line can also be used as the light source 111. In such a case, an optical system such as a frost can also be used as the beam expander 112.

The image capture apparatus 120 includes an image capture element 121; an imaging lens 122 that forms the image L' of the emitted light on the image capture plane of the image capture element 121 (FIGS. 2A and 2B); and a bandpass filter 123 that selectively allows light having the wavelength of the emitted light to pass through.

The control device 130 is connected to the illumination apparatus 110, the image capture apparatus 120, and the notification device 160, and controls these components. The control device 130 is, for example, a microcomputer. In addition, the control device 130 is connected to the calculation device 300, and outputs an output value to the calculation device 300 in accordance with a command from the calculation device 300. The control device 130 may also carry out operations as a determination device (determiner), which determines what range the distance from the measurement probe 100 to the work piece W is.

As illustrated in FIG. 2A, the front surface of the housing 140 is provided with a first window 141 where the light emitted from the illumination apparatus 110 is emitted at the work piece W, and a second window 142 where the image L of the emitted light produced by the surface of the work piece W is captured by the image capture apparatus 120. In addition, as illustrated in FIG. 3, the contact-type measurement probe 400 is mounted to the housing 140. The contact-type measurement probe 400 projects in the forward direction of the housing 140, for example.

The grip 150 is provided on a back surface side of the housing 140.

The notification device 160 includes, for example, a light emitting device 161 such as an LED that is provided on a back surface of the measurement probe 400; a vibration generating device 162 provided inside the grip 150; and a sound generating device (not shown in the drawings) provided outside the measurement probe 100. The configuration of the notification device 160 can be modified as appropriate.

Image Capture Apparatus 120

Figure 4:
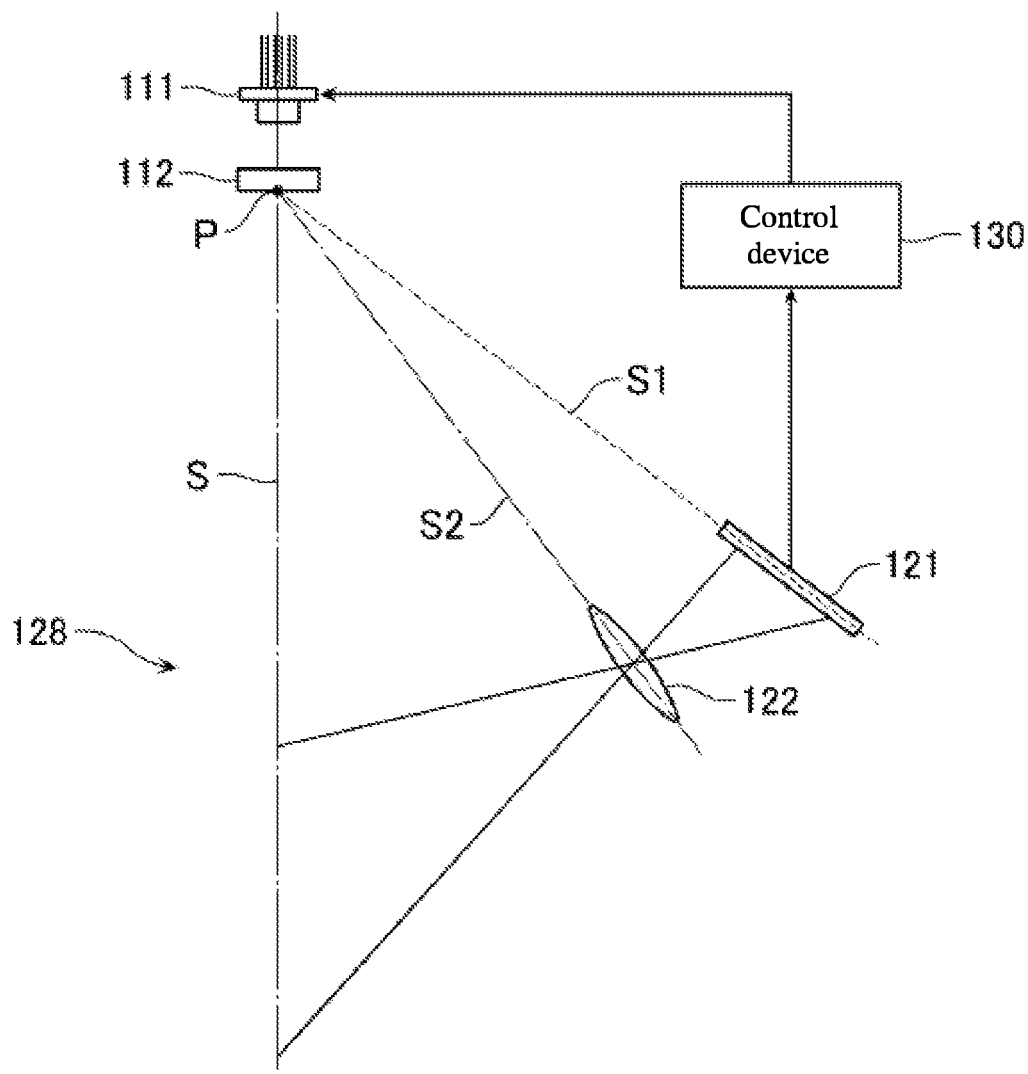
FIG. 4 is an explanatory diagram of an arrangement of structures inside an image capture apparatus 120.

As illustrated in FIG. 4, a Scheimpflug optical system 128 can be adopted for the optical system of the image capture apparatus 120. In the Scheimpflug optical system 128, a plane S1 parallel to the image capture plane of the image capture element 121, a plane S2 perpendicular to the optical axis of the imaging lens 122, and the plane S on which the light is emitted intersect at a predetermined straight line P. With such an arrangement, the entire image capture plane of the image capture element 121 is in focus with respect to the plane S. Another optical system besides the Scheimpflug optical system 128, such as a telecentric optical system, can also be adopted for the optical system of the image capture apparatus 120.

Figure 5:
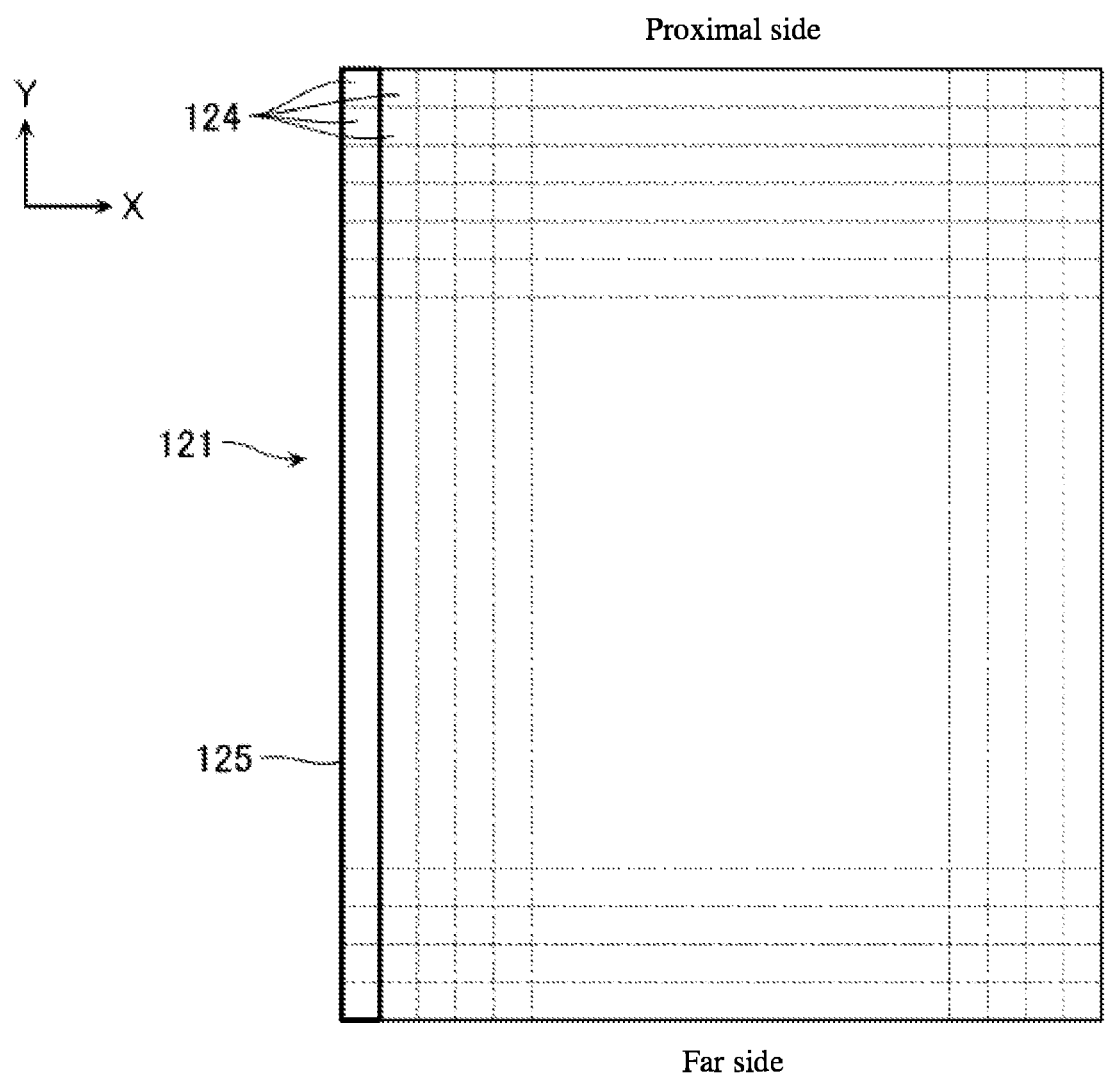
FIG. 5 illustrates an image capture plane of an image capture element 121 and a photoreceiver element 124 arranged on the image capture plane.

As illustrated in FIG. 5, the image capture element 121 includes a plurality of photoreceiver elements 124 that are arranged in X and Y directions. The image capture element 121 may be a CMOS image sensor, for example. The image capture element 121 simultaneously retrieves data from a column 125 of a plurality of the photoreceiver elements 124 arranged in the Y direction, for example. Then, the image capture element 121 selects, for example, a column adjacent to the column 125 and simultaneously retrieves data from the plurality of photoreceiver elements 124 contained in the column. By continuing to retrieve data on a running basis in this same manner, image data is generated. Some other image capture element, such as a CCD image sensor, can also be adopted as the image capture element 121 instead of the CMOS image sensor.

Figure 6:
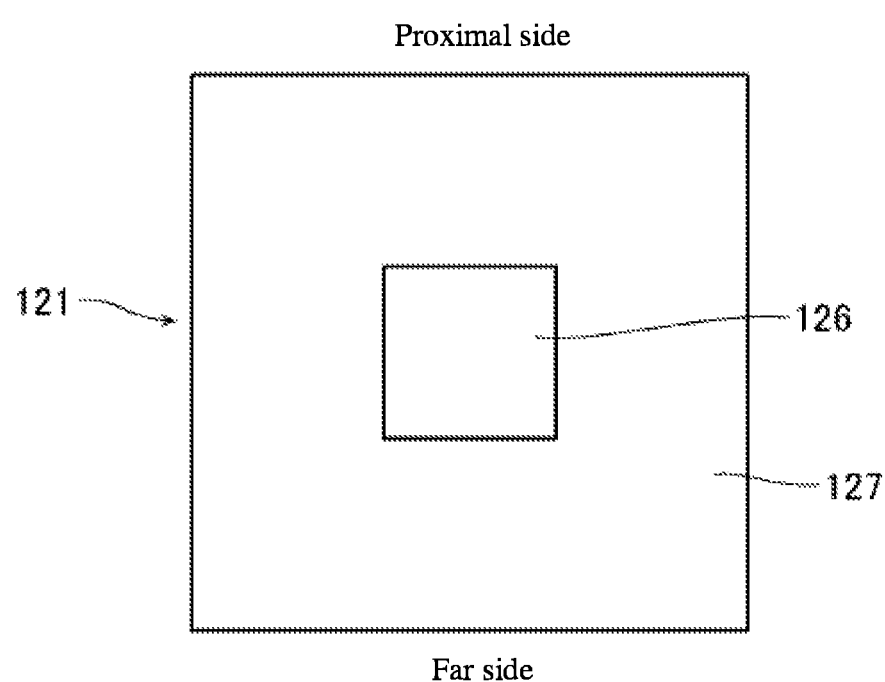
FIG. 6 illustrates the image capture plane of the image capture element 121 and a measurement region 126 and monitoring region 127 arranged in the image capture plane.

As illustrated in FIG. 6, a measurement region 126 and a monitoring region 127 that has the maximum pixel range are arranged in the image capture plane of the image capture element 121. The measurement region 126 is provided in the vicinity of the center of the image capture plane, for example. The measurement region 126 can also be configured as a rectangular region, for example, and can also be configured as a circular or elliptical region. The measurement region 126 can be arranged in a region of the image capture plane of the image capture element 121 that is particularly favorable for being in focus with respect to the plane S. The monitoring region 127 is the entire region of the image capture plane, including the measurement region 126. For example, in response to a command from the control device 130, the image capture element 121 defines a retrieval region (region of interest (ROI)) of the image capture element 121 as the measurement region 126 or the monitoring region 127. When the retrieval region is defined as the measurement region 126, the number of photoreceiver elements 124 used in the image capture decreases and the retrieval time for the data decreases, and therefore the frame rate of the image capture element 121 increases. Meanwhile, when the retrieval region is defined as the monitoring region 127, the number of photoreceiver elements 124 used in the image capture increases and the retrieval time for the data increases, and therefore the frame rate of the image capture element 121 decreases.

Control Device 130

Figure 7:
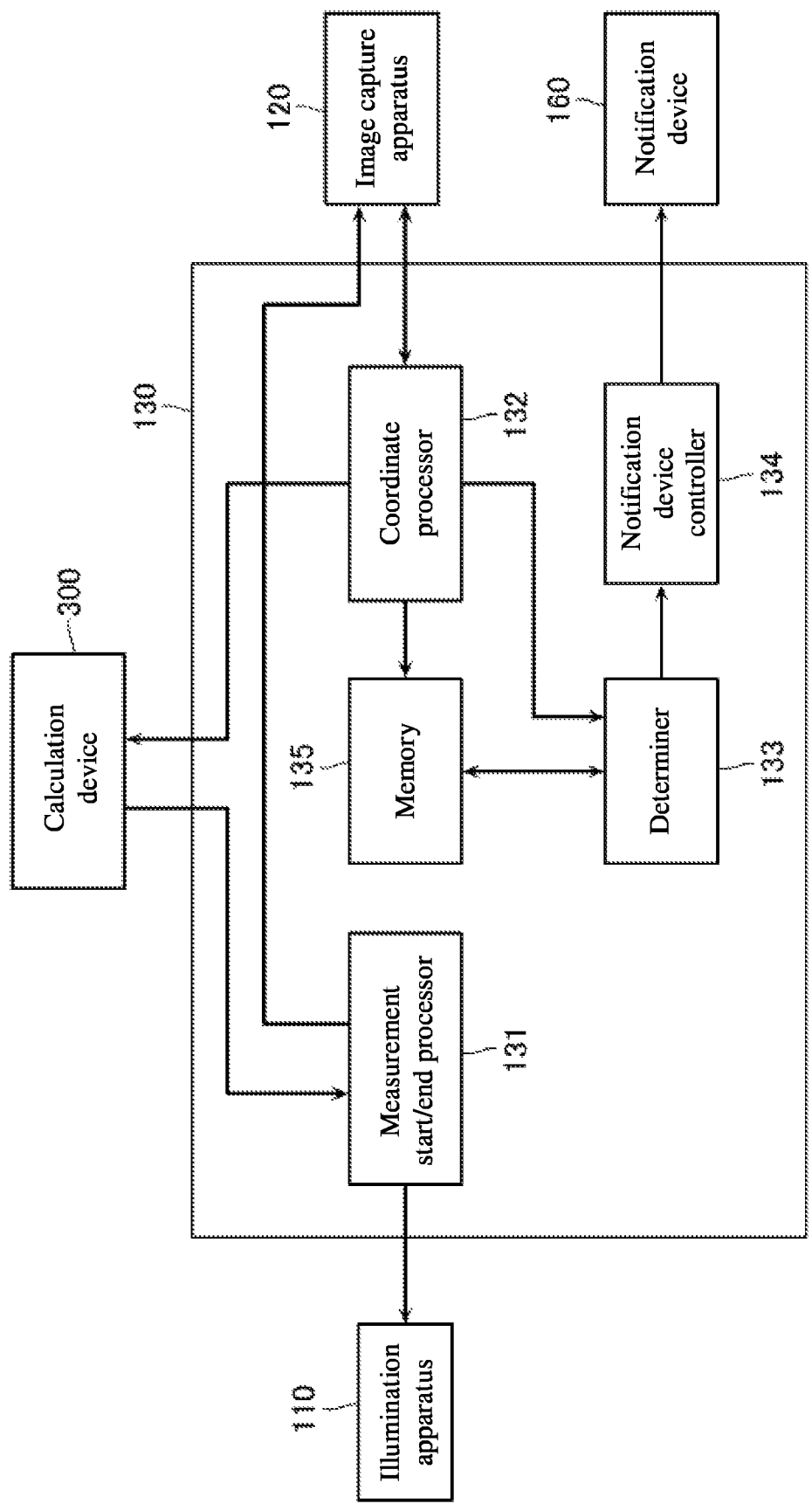
FIG. 7 is a block diagram illustrating a configuration of a control device 130.

As illustrated in FIG. 7, the control device 130 (also referred to as a controller or a processor) includes a measurement start/end processor 131 that processes a start time/end time of a measurement process; a coordinate processor 132 that performs a coordinate process on image data received from the image capture apparatus 120; a determiner 133 that determines the range of the distance from the measurement probe 100 to the work piece W; a notification device controller 134 that controls the notification device 160 based on the result of the determination made by the determiner 133; and a memory 135 that stores the result of the determination made by the determiner 133.

The measurement start/end processor 131 starts a non-contact measurement process in response to a command from the calculation device 300, for example. In such a case, the illumination apparatus 110 is controlled so as to initiate emitting the light, and the image capture apparatus 120 is controlled so as to initiate image capture. In addition, the measurement start/end processor 131 ends the measurement process in response to a command from the calculation device 300, for example.

The coordinate processor 132 receives image data, such as that shown in FIG. 2B for example, from the image capture apparatus 120 and, for each column 125 (FIG. 5) of the photoreceiver elements 124, calculates a Y direction coordinate value of each point configuring the image L' to calculate coordinate data for the image L'. In addition, using the coordinate data for the image L', the coordinate processor 132 calculates the distance from the measurement probe 100 to the work piece W. For example, the point closest to the proximal side in the coordinate data for the image L' is acquired as the coordinate data for the proximal point $P_L$. Also, the coordinate processor 132 stores the coordinate data for the proximal point $P_L$ in the memory 135 and transmits the coordinate data for the proximal point $P_L$ to the calculation device 300. In addition, the coordinate processor 132 determines whether the image L of the emitted light has been captured in the measurement region 126 of the image capture element 121, for example. When the coordinate processor 132 determines that the image L has been captured, the retrieval region of the image capture element 121 is defined as the measurement region 126, and when the coordinate processor 132 does not determine that the image L has been captured, the retrieval region is defined as the monitoring region 127. Moreover, when the retrieval region of the image capture element 121 is defined as the monitoring region 127, the coordinate processor 132 determines whether the image L of the emitted light has been captured in the monitoring region 127 of the image capture element 121.

Figure 8:
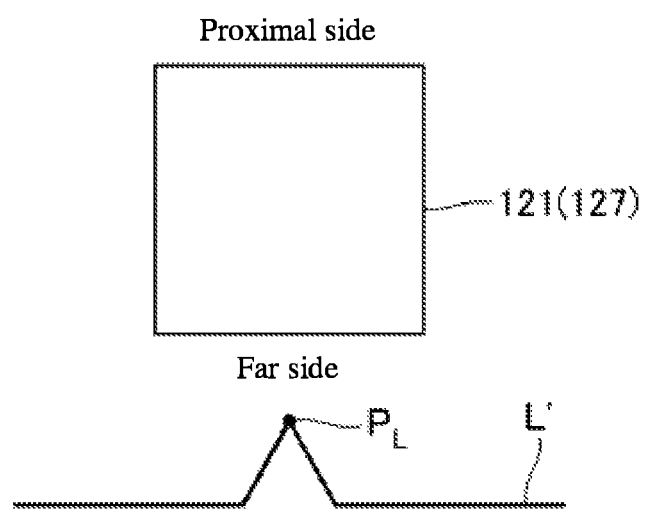
FIG. 8 illustrates a relationship between the image capture element 121 and an image L' in a case where a distance from the measurement probe 100 to a work piece W is within a far range.
Figure 9:
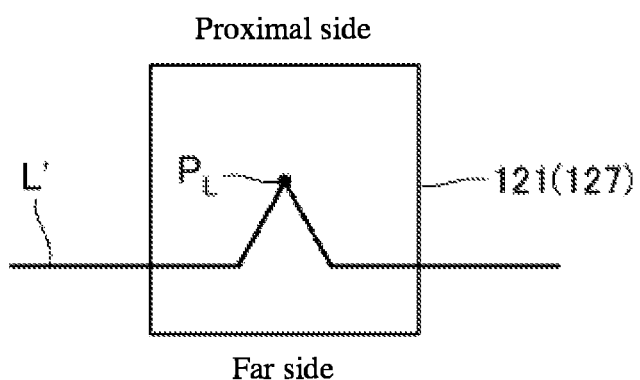
FIG. 9 illustrates a relationship between the image capture element 121 and the image L' in a case where the distance from the measurement probe 100 to the work piece W is within an imageable range.
Figure 10:
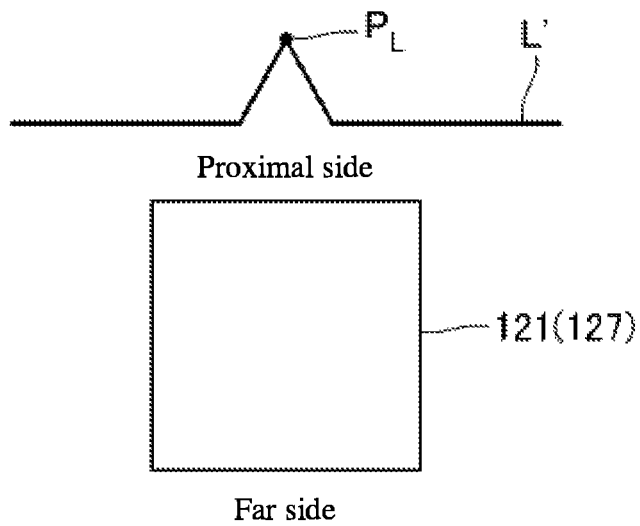
FIG. 10 illustrates a relationship between the image capture element 121 and the image L' in a case where the distance from the measurement probe 100 to the work piece W is within a proximal range.

The determiner 133 determines what range the distance from the measurement probe 100 to the work piece W is. For example, as illustrated in FIG. 8, when the distance is sufficiently large, the image L' is not formed on the image capture plane of the image capture element 121. Hereafter, this distance range is called a "far range." As illustrated in FIG. 9, for example, when the distance is within a predetermined range, the image L' forms on the image capture plane of the image capture element 121. Hereafter, this distance range is called an "imageable range." And as illustrated in FIG. 10, for example, when the distance is less than the imageable range, the image L' is not formed on the image capture plane of the image capture element 121. Hereafter, this distance range is called a "proximal range."

Figure 11:
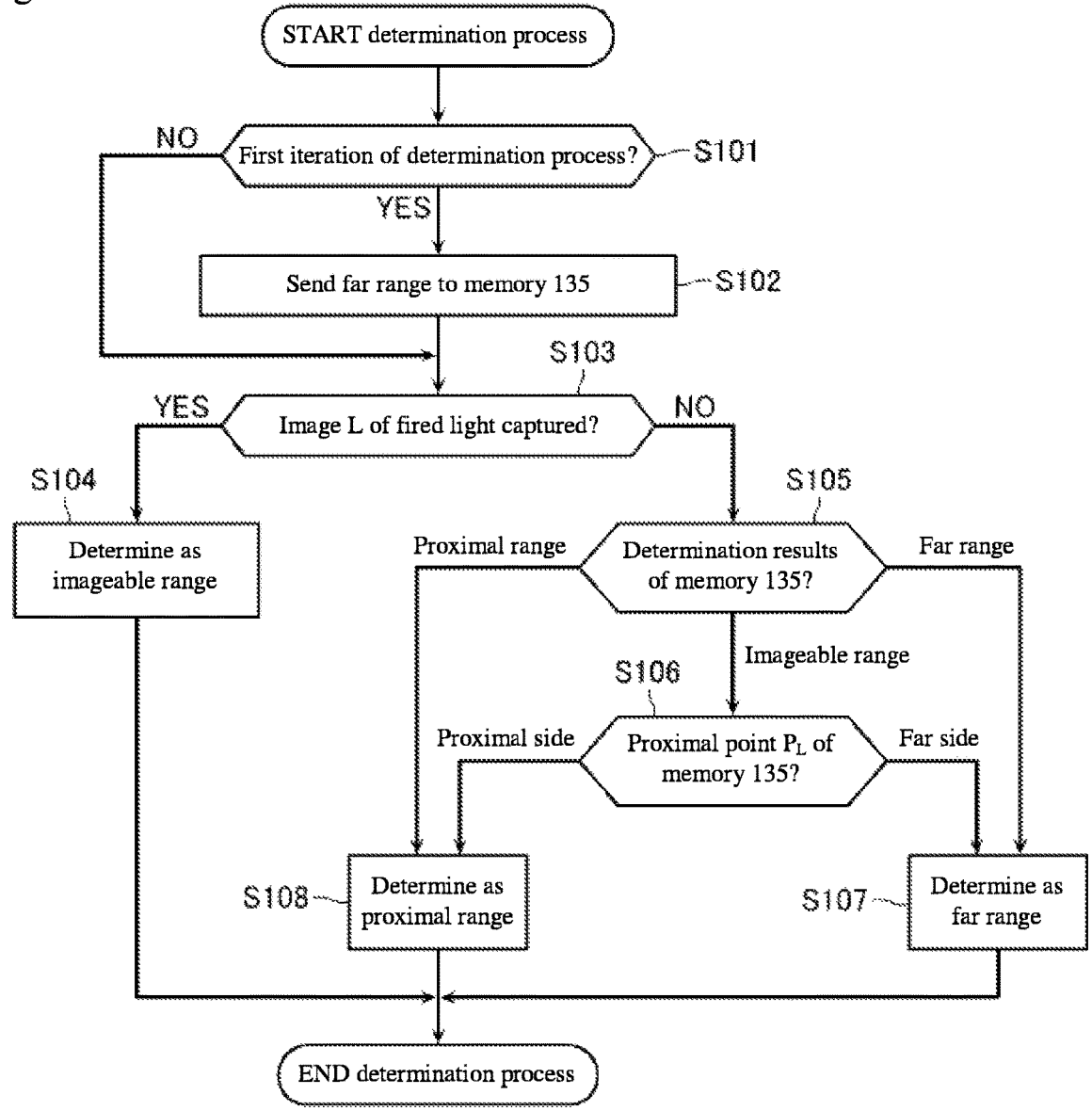
FIG. 11 is a flow chart illustrating a determination process performed by the control device 130.

As illustrated in FIG. 11, the determiner 133 first determines whether the determination process performed by the determiner 133 is the first iteration of the process since beginning measurement (S101).

When the determiner 133 determines in step S101 that the process is the first iteration of the process, the determiner 133 stores in the memory 135 information indicating that the distance from the measurement probe 100 to the work piece W is within the far range (S102).

When the determiner 133 does not determine in step S101 that the process is the first iteration of the process, or when step S102 ends, the determiner 133 determines whether the image L of the emitted light has been captured by the image capture apparatus 120 (S103). This determination is made based on the results of a determination made by the coordinate processor 132, for example.

When the determiner 133 determines in step S103 that the image L of the emitted light has been captured, the determiner 133 determines that the distance from the measurement probe 100 to the work piece W is within the imageable range (S104). In addition, as the determination results, the determiner 133 transmits information indicating that the distance to the work piece W is within the imageable range to the memory 135, where the information is stored; transmits the information to the notification device controller 134; and associates the information with the coordinate data for the image L' and transmits the associated information and data to the calculation device 300. After this, the determination process ends.

When the determiner 133 does not determine in step S103 that the image L of the emitted light has been captured, the determiner 133 references the determination results stored in the memory 135 (S105). In the case of the first iteration of the process since beginning measurement, the determination results stored in the memory 135 are the far range, and in the case of the second iteration of the process onward, the determination results are those for the previous process.

When information indicating that the distance to the work piece W is within the imageable range is stored in the memory 135 as the determination results in step S105, the determiner 133 further references the coordinate data for the proximal point $P_L$ stored in the memory 135 and determines whether the coordinate data is closer to the proximal side or the far side of the image capture plane of the image capture element 121 (S106).

When information indicating that the distance to the work piece W is within the far range is stored in the memory 135 as the determination results in step S105, or when the coordinate data for the proximal point $P_L$ is determined to be closer to the far side of the image capture plane of the image capture element 121 in step S106, the determiner 133 determines that the distance from the measurement probe 100 to the work piece W is within the far range (FIG. 8) (S107). In addition, as the determination results, the determiner 133 transmits information indicating that the distance to the work piece W is within the far range to the memory 135, where the information is stored; transmits the information to the notification device controller 134; and associates the information with the coordinate data for the image L' and transmits the associated information and data to the calculation device 300. After this, the determination process ends.

When information indicating that the distance to the work piece W is within the proximal range is stored in the memory 135 as the determination results in step S105, or when the coordinate data for the proximal point $P_L$ is determined to be closer to the proximal side of the image capture plane of the image capture element 121 in step S106, the determiner 133 determines that the distance from the measurement probe 100 to the work piece W is within the proximal range (FIG. 10) (S108). In addition, as the determination results, the determiner 133 transmits information indicating that the distance to the work piece W is within the proximal range to the memory 135, where the information is stored; transmits the information to the notification device controller 134; and associates the information with the coordinate data for the image L' and transmits the associated information and data to the calculation device 300. After this, the determination process ends.

As illustrated in FIG. 7, the notification device controller 134 receives the determination results from the determiner 133 and controls the notification device 160 based on these results.

For example, when the notification device controller 134 receives, as the determination results, information indicating that the distance to the work piece W is within the far range, a low power consumption process is preferably performed. For example, the LED of the light emitting device 161 (FIG. 3) can be made to turn off and on at a fixed periodicity.

Also, when the notification device controller 134 receives, as the determination results, information indicating that the distance to the work piece W is within the imageable range, for example, various processes may be performed. For example, the periodicity of turning the light on and off can be adjusted in accordance with the distance from an end point of the proximal side of the image capture plane of the image capture element 121 to the proximal point $P_L$, or a sound generating device can be controlled to produce a warning sound in accordance with this distance.

Also, when the notification device controller 134 receives, as the determination results, information indicating that the distance to the work piece W is within the proximal range, for example, the notification device controller 134 preferably draws the attention of the measurement operator and thereby issues a notification that there is a risk of the work piece W and the measurement probe 100 coming into contact. For example, the LED of the light emitting device 161 (FIG. 3) can be flashed, the grip 150 of the measurement probe 100 can be vibrated by the vibration generating device 162, and a warning sound can be produced by the sound generating device (not shown in the drawings).

The memory 135 stores the coordinate data for the proximal point $P_L$ that is calculated by the coordinate processor 132, as well as the results of the determination made by the determiner 133. The coordinate data and determination results stored in the memory 135 are frequently updated in response to the coordinate process and the determination process. The memory 135 can also store only the immediately prior data, and can also store earlier data than that using a configuration such as a circular buffer, for example.

Effects

The coordinate measuring device according to the present embodiment is provided with the non-contact-type measurement probe 100, which includes the illumination apparatus 110 that emits light at the work piece W along the plane S, and the image capture apparatus 120 that captures, from a position other than the plane S, the image L of the emitted light produced by the surface of the work piece W.

As noted above, in the coordinate measuring device having this configuration, in a case where the distance from the measurement probe 100 to the work piece W drifts out of the imageable range, determining whether the distance is in the far range (more distant than the imageable range) or in the proximal range (closer than the imageable range) has not been possible.

In light of this, and as a result of investigation by the inventors of the present invention, it was understood that in cases where measurement is conducted using a coordinate measuring device having this configuration, for operation reasons, a majority of measurement operators begin measurement in the far range or the proximal range.

Given this, in the present embodiment, at the point where light begins to be emitted, a distance between the work piece W and the measurement probe 100 is stipulated as being inside the far range (FIG. 8) and is stored in the memory 135, and in the determination process, this information that is stored in the memory 135 is referenced and the range of the distance is determined, and the determination results stored in the memory 135 are updated. Through such a method, by continuously monitoring the distance range, even in a case where the distance from the measurement probe 100 to the work piece W drifts out of the imageable range, determining whether the distance is in the far range (more distant than the imageable range) or in the proximal range (closer than the imageable range) is possible.

In addition, in the coordinate measuring device according to the present embodiment, the contact-type measurement probe 400 is mounted to the non-contact-type measurement probe 100, and touch measurement and scanning measurement can be performed with the measurement probe 400. However, in a case where the work piece W has significant unevenness, for example, there is a risk that the non-contact-type measurement probe 100 may touch the work piece W during touch measurement or scanning measurement. In order to inhibit this from occurring, control similar to that in a non-contact measurement can be performed by the control device 130 during contact measurement using the contact-type measurement probe 400, as well.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A coordinate measuring device comprising:
a non-contact-type measurement probe comprising:
a light emitter that emits light at a work piece along a plane;
an image capturer that captures, from a position other than the above-noted plane, an image of the emitted light produced by a surface of the work piece; and
a housing that accommodates the light emitter and the image capturer;
a processor and a memory that stores an instruction, the processor further comprising, as a configuration when the processor executes the instruction stored in the memory:
a determiner that determines whether a distance from the non-contact-type measurement probe to the work piece is in an imageable range where the image capturer can capture the image of the emitted light, in a far range that is more distant than the imageable range, or in a proximal range that is closer than the imageable range;

an indicator that issues a notification of determination results of a determination made by the determiner, wherein the memory stores the determination results, wherein the indicator comprises:
- a light emitting device provided on a surface of the housing; and
- a sound generator that produces a sound that provides notification of the determination results; and wherein the determiner:
- at the point where light begins to be emitted, stores in the memory, as the determination results, information indicating that the distance from the non-contact-type measurement probe to the work piece is within the far range, and
- references results of image capture by the image capturer and the determination results stored in the memory and determines a range of the distance from the non-contact-type measurement probe to the work piece, and updates the determination results stored in the memory.

2. The coordinate measuring device according to claim 1, wherein when determining the range of the distance from the non-contact-type measurement probe to the work piece, the determiner:
- determines whether the image of the emitted light has been captured by the image capturer,
- when the determiner determines that the image has been captured, determines that the distance from the non-contact-type measurement probe to the work piece is within the imageable range,
- when the determiner does not determine that the image of the emitted light has been captured, references the determination results stored in the memory,
- when the information indicating that the distance from the non-contact-type measurement probe to the work piece is within the far range is stored as the determination results, determines that the distance from the non-contact-type measurement probe to the work piece is within the far range, and
- when the information indicating that the distance from the non-contact-type measurement probe to the work piece is within the proximal range is stored as the determination results, determines that the distance from the non-contact-type measurement probe to the work piece is within the proximal range.

3. The coordinate measuring device according to claim 2, wherein, when determining the range of the distance from the non-contact-type measurement probe to the work piece, the determiner:
- in a case where the determiner determines that the image of the emitted light has been captured, calculates and stores in the memory the distance from the non-contact-type measurement probe to the work piece based on the image of the emitted light, and
- when the determiner does not determine that the image of the emitted light has been captured, and the information indicating that the distance from the non-contact-type measurement probe to the work piece is within the imageable range is stored in the memory as the determination results, based on the information indicating the distance from the non-contact-type measurement probe to the work piece that is stored in the memory, determines that the distance from the non-contact-type measurement probe to the work piece is within the far range or within the proximal range.

4. The coordinate measuring device according to claim 1, wherein:
- the non-contact-type measurement probe further comprises a grip configured to be gripped by a measurement operator during a measurement, and
- the indicator comprises a vibration generator that provides a notification of the determination results by vibrating the grip.

5. The coordinate measuring device according to claim 1, further comprising a contact-type measurement probe mounted to the non-contact-type measurement probe,
wherein during a measurement using the contact-type measurement probe, the determiner determines the range of the distance from the non-contact-type measurement probe to the work piece.

* * * * *